H. DE OLANETA.
MANUFACTURE OF DRY CELLS.
APPLICATION FILED FEB. 24, 1920.
1,430,726.
Patented Oct. 3, 1922.
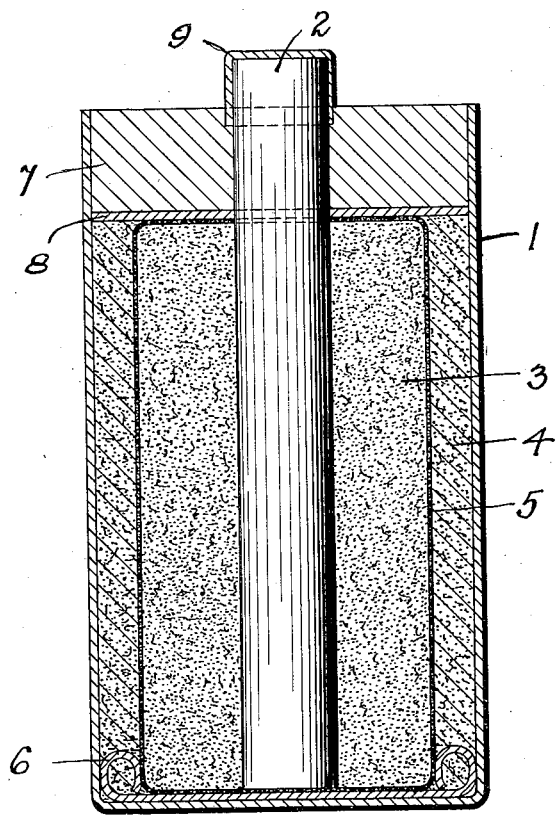
Inventor
Harold de Olaneta,
By
Attorney Patented Oct. 3, 1922.

1,430,726

UNITED STATES PATENT OFFICE.

HAROLD DE OLANETA, OF NEW HAVEN, CONNECTICUT, ASSIGNOR TO WINCHESTER REPEATING ARMS COMPANY, OF NEW HAVEN, CONNECTICUT, A CORPORATION OF CONNECTICUT.

MANUFACTURE OF DRY CELLS.

Application filed February 24, 1920. Serial No. 360,553.

*To all whom it may concern:*

Be it known that I, HAROLD DE OLANETA, of New Haven, county of New Haven, State of Connecticut, have invented certain new and useful Improvements in the Manufacture of Dry Cells, of which the following is a full, clear, and exact description.

This invention relates to galvanic cells, and more particularly to dry cells.

In dry cells of the type now found on the market in large numbers, and especially those used for pocket flash lights or hand lamps, the zinc electrode is in the form of a cup in which are contained a carbon electrode with a surrounding body of depolarizing material, and an exciting paste interposed between the depolarizing material and the side wall of the cup. The depolarizing material usually consists of a mixture of manganese dioxid and carbon which is formed into a block or cartridge about the carbon electrode and is contained within an envelope or bag of cheese cloth or the like.

In the manufacture of cells of this type, the paste when placed in the cell ordinarily contains a solution of ammonium chlorid, which is the principal exciting agent, and a solution of zinc chlorid, which, owing to its deliquescent nature, serves to keep the paste moist. The depolarizing mixture, consisting of finely divided manganese dioxid and carbon (graphite), is usually moistened with a solution containing ammonium chlorid and zinc chlorid, so as to facilitate the passage of the ions from one electrode to the other through the depolarizing body and paste.

One of the primary objects of the present invention is the production of a new and improved manganese depolarizing material for cells of this general character.

Another object of the invention is to furnish a new and improved method of preparing the depolarizing material.

Still further objects of the invention are to increase the longevity of the cell, both on the shelf and in the hands of the user; to provide a relatively cheap cell having satisfactory electrical characteristics and good service capacity; and to improve and simplify the process of manufacturing the cell.

To these and other ends, the invention consists in the novel features and procedure to be hereinafter described and claimed.

In the accompanying drawing, the single view is a diagrammatic vertical section of a dry cell constructed in accordance with the invention.

The cell selected for illustration comprises the usual zinc cup 1, constituting the positive electrode. The negative carbon electrode 2 has tamped about it a block or cartridge 3 of a suitable depolarizing mix, referred to in greater detail hereinafter; and interposed between the side wall of the cup and the depolarizing material is a paste 4. The depolarizing cartridge is usually contained in a bag or envelope 5 of cheese cloth or the like. It is centered in the cup at the bottom by a suitable centering washer 6. At the top of the cell, the latter is sealed in any suitable manner as by a pitch seal 7 on top of a paper washer 8. The carbon electrode is provided with the usual contact cap 9.

Cells made up in the usual way, with an ammonium-chlorid-containing paste in direct contact with the zinc, are apt to deteriorate considerably before they are placed in use, owing to the fact that, due to local action, the ammonium chlorid commences its attack on the zinc as soon as the parts of the cell are put together. Local action is set up, for example, as a result of the presence of impurities in the zinc, or by reason of differences in the molecular structure of the same at different parts of the cup. Under present conditions of manufacture and distribution, there is usually a considerable interval between the time when the cell is first assembled and the time when it reaches the consumer for use. It is not uncommon for the cells to remain in the factory a week or longer, owing to delays in packing and shipping. Furthermore, when they leave the factory it takes some time for them to reach the retailer, and, of course, they may remain on the shelf of the retailer for a long period before they are purchased and used. Consequently when a cell is finally put into use, the zinc cup is likely to be considerably eaten away, and the active life of the cell is, therefore, seriously impaired.

In order to overcome the objection to which I have just referred, I prefer to provide a paste which is initially devoid of ammonium chlorid. The paste is preferably composed of wheat flour or some other cereal, zinc chlorid solution, and a mercury compound. In making up a batch of paste for the manufacture of a number of cells, I mix together, for example, 12.5 kilograms of wheat flour, 50 litres of zinc chlorid solution at 27° Baume', and 12.5 grams of mercuric chlorid. The ingredients are mixed together until all of the flour is dissolved, and the mass is stirred, while being cooked, until a stiff paste is formed. The cooking is effected before the paste is placed in the cell.

The depolarizing body preferably comprises a mixture of manganese dioxid, graphite, and ammonium chlorid; for example, in the proportions of 37.5 units of manganese hydrate, 12.5 units of graphite and 10 units of ammonium chlorid. These ingredients, which are in a fine state of subdivision are mixed with water until the mass is plastic and homogeneous, whereupon it is formed into the block or cartridge 3 about the carbon electrode 2 in a manner well understood in the art.

The paste will keep for a long time and does not have to be used at once owing to the fact that the zinc chlorid is of an antiseptic nature and acts as a preservative for the vegetable substance, e. g., wheat flour. The drawbacks incident to the incorporation in the paste of ammonium chlorid, which is a bacterial food, are eliminated.

When the cell is first put together, the ammonium chlorid does not immediately commence its attack on the zinc, owing to the fact that it must first traverse the paste. The ammonium chlorid passes out only gradually from the cartridge into the paste and to the zinc. Thus the cell is not at maximum efficiency when first assembled as is ordinarily the case, but reaches maximum efficiency after a definite interval has passed, depending upon the distance between the depolarizing cartridge and the side wall of the zinc cup. For example, with the smaller sizes of cells commonly used for pocket flash lights, the distance which has to be traversed by the principal electrolyte salt before it reaches the zinc, is such that maximum efficiency is not obtained for a period varying from two weeks to a month. In a larger size, where the ammonium chlorid has to traverse a greater distance, the conditions usually obtaining in a freshly made cell do not obtain for approximately three months. Therefore there is likelihood that the cell will not reach its maximum efficiency until about the time that it is placed in use. At any rate the life of the cell in the hands of the consumer is considerably increased owing to the fact that the length of time that the ammonium chlorid acts on the zinc previous to the use of the cell, is considerably reduced.

In the case under discussion, the ammonium chlorid passes outward through the porous envelope 5 of the cartridge into the paste and to the zinc, and the zinc chlorid in the paste passes into the cartridge; but it will be apparent that the invention is not limited to a cell wherein the depolarizing cartridge has a porous envelope. Regardless of whether or not an envelope is employed, the paste takes up ammonium chlorid from the cartridge and the cartridge takes up zinc chlorid from the paste. Furthermore, these substances are distributed as needed for the best working of the cell. Heretofore, in manufacturing cells wherein the paste contained both zinc chlorid and ammonium chlorid, there was considerable difficulty in properly proportioning these two substances. It was necessary to weigh the substances and to compare the density of their solutions, etc., and even where great care was exercised in compounding the paste, the results were not always satisfactory. In the present case, however, the process of manufacture is considerably simplified, because it is not necessary to mix the chlorids and because such great care in attempting to reach a definite proportion of the ingredients is unnecessary. With my improved cell, the ammonium chlorid is fed or supplied to and taken up by the paste in the proper quantity for the best working, and the zinc chlorid is fed to and taken up by the cartridge in the proper quantity for best working, regardless of the quantities of those substances which are used, within certain limits.

The chlorid of mercury in the paste serves the usual purpose of amalgamating the zinc.

The manganese dioxid in the so-called depolarizing mix is of a special character. By preference I take a recovered manganese obtained as a by-product in the manufacture of saccharin. The latter substance may be prepared from toluene. In the process, orthotoluenesulphonamid is oxidized by means of potassium permanganate. The permanganate is by this reaction reduced to $MnO_2(H_2O)x$, which is thrown down as a fine precipitate of dark blue color. By analysis a sample of this recovered manganese has been found to contain the following:

| | Per cent. |
|---|---|
| Moisture, ammonia and other volatiles at 200° C | 17.30 |
| Manganese dioxid, calculated from available oxygen | 58.74 |
| Manganese dioxid, by analysis | 59.97 |
| Water soluble extract, organic and inorganic (including carbonates) | 8.21 |
| Ammonia by distillation | .00 |
| Carbon dioxid, from soluble carbonate | 1.07 |
| Carbon dioxid, from insoluble carbonate | 1.93 |
| Insoluble sulphates as $SO_3$ | .34 |
| Sulphur from organic compounds | .31 |
| Silica ($SiO_2$) | .14 |
| Lime as $CaO$ | .13 |
| Chlorin as soluble chlorids | .045 |
| Iron, sulphides, phosphates, etc | Traces. |
| Carbon (free) | Trace. |

It has been proposed heretofore to utilize material of this general character as a depolarizer in a dry cell, but so far as I am aware, it has never been used very successfully for that purpose. After considerable research and experiment, however, I have found that by a special preliminary treatment, hereinafter described, such material may be converted into a very satisfactory depolarizer for dry cells, especially those of the miniature type, when the treated material is mixed with a proper amount of graphite or like conducting material.

In accordance to my invention, I purify the recovered manganese, preferably the manganese recovered in the manufacture of saccharin, by lixiviation with a solution of a neutral salt, such as ammonium chlorid. The manganese material as received from the saccharin works is dumped into a suitable tank having a perforated or screenlike bottom. On the bottom of the tank is placed a suitable piece of filtering material, such as cloth. A certain amount of space is left at the top of the tank to receive the solution which is to be poured in. In making the particular cell herein described, I employ as a lixiviating or leaching agent a solution of ammonium chlorid of usual electrolyte concentration, say 2° Baumé. A quantity of this solution is poured into the top of the tank, onto the material, and permitted to percolate through it. If it be assumed that the manganese material takes up two-thirds of the tank capacity, the remaining one-third will be filled with the solution, which will pass completely into the material under treatment in, say, twenty-four hours. Another similar quantity of the solution will then be poured into the tank and allowed to pass down into the material in the same manner. After the lapse of forty-eight hours, for example, a third quantity of solution will be poured into the tank, and similar quantities will be poured in at approximately equal intervals thereafter, as needed. When the solution commences to pass out of the tank at the bottom, the same is tested in any suitable manner which permits comparison with the solution being poured in at the top, for example, by means of a hydrometer. The increase in density will show strong contamination of the liquid during the first stages of the process, but gradually the impurities in the solution will thin out and a decrease of density will be noted until the solution coming out of the tank at the bottom has the same density as that poured in at the top. No further tests are then needed. The material is then removed from the tank or vat and dried thoroughly in a hot room where it is subjected to a temperature of approximately 140° F. During the drying of the purified material, the same takes up a considerable amount of oxygen, due to the removal of the impurities. It is preferable to expose the purified material to the air for some time, before it is mixed with the carbonaceous material, so that a maximum amount of oxygen will be taken up before it is incorporated in the depolarizing mix, but this is not essential in all cases.

A sample of the recovered manganese after the treatment with the ammonium chlorid solution, as herein described, and which had initially the constituents noted in the preceding table, was found to contain the following:

| | Per cent. |
|---|---|
| Moisture, ammonia and other volatiles at 200° C | 30.00 |
| Manganese dioxid, calculated from available oxygen | 64.89 |
| Manganese dioxid, by analysis | 65.64 |
| Water soluble extract, organic and inorganic (including carbonates) | .41 |
| Ammonia by distillation (included in first item) | 5.07 |
| Carbon dioxid, from soluble carbonate | .47 |
| Carbon dioxid, from insolube carbonate | .32 |
| Insoluble sulphates as $SO_3$ | .10 |
| Sulphur from organic compounds | .35 |
| Silica ($SiO_2$) | .14 |
| Lime as $CaO$ | .00 |
| Chlorine as soluble chlorids | .032 |
| Iron, sulphides, phosphates, etc | Traces. |
| Carbon (free) | Trace. |

By comparison of the two tables, it will be seen that the available oxygen content has been remarkably increased. A considerable quantity of impurities, including carbonates and carbon dioxid, is removed. Approximately 5% of ammonia is added, but substantially all of it passes off by evaporation before the material is used in the cell.

By the treatment herein described, the shelf life of the cell is considerably increased, owing to the fact that the impurities likely to set up deleterious local action are eliminated. Furthermore, a cell in which the treated manganese material is used in the depolarizing mix usually has one or more markedly superior electrical characteristics as compared to a cell containing the original manganese material. For example, in tests of two No. 5 cells, designated A and B respectively, in which cell B contained the untreated manganese (other factors being the same), the following results were shown:

| Class. | Open circuit voltage. | Short circuit current. | Internal resistance. | Service capacity. |
|---|---|---|---|---|
| | Volts. | Amperes. | Ohms. | Minutes. |
| A | 1.48 | 4.3 | .58 | 590 |
| B | 1.44 | 3.3 | .75 | 435 |

It will be observed that the increase in service capacity is especially noteworthy, although the increase in short circuit current is likewise important. Of course, the augmented service capacity is explained by the marked increase in the oxygen content of the manganese material in the depolarizer. The improvement in the other three electrical characteristics is not to be explained so readily, but is nevertheless of great practical importance.

The particular tests, above mentioned, were made immediately after the assembly of the cells in question, with the ammonium chlorid in the mix only, and the zinc chlorid solution in the paste only. During the test for service capacity, in which the discharge characteristics of the respective cells were obtained by discharging them individually on a resistance of 2.75 ohms, the voltage dropped sharply during the first ten minutes, but not thereafter, and a good current for the greater part of the discharge period was obtained. This shows that while my improved cell ordinarily does not reach its maximum efficiency until some time after it has been assembled, it can be successfully used when freshly made. If, however, the cell is allowed to stand for some time before being placed in use, as is usually the case, a discharge curve, which is extremely good, can be obtained. Under the most favorable conditions, cells of the kind just mentioned have shown a useful life of 710 minutes (continuous service). The cell also has very good powers of recovery when used intermittently.

The improved characteristics of the cell containing the artificial manganese dioxid, preliminarily treated as herein described, are believed to be due in a large measure to the removal of impurities in the manganese material which prevent a free absorption of oxygen, and set up local action. The impurities vary somewhat, depending upon the chemicals used for precipitation, but lime and potash are frequently found. When chemically combined with the manganese, these impurities are insoluble in water, and when it is attempted to separate them out by use of acids, for example, as has heretofore been proposed, the result will either be that the manganese is dissolved on the one hand, or on the other hand, that insoluble compounds are created. When my process has been practiced, and the impurities removed, the manganese material will absorb a large content of oxygen, which it gives up freely when the battery is in use, so that a very good depolarizing action is obtained. Due to the absence of the impurities, also, the manganese material quickly reabsorbs a considerable amount of oxygen after the cell has been used. The precipitate which I prefer to use is, as stated, a residue of potassium permanganate thrown down as a fine dark blue precipitate. This material, more especially the by-product of saccharin manufacture, seems to be especially well adapted to the ammonium chlorid treatment. Insoluble compounds are not created as would be the case if an acid were used for leaching, and yet, as a result of the porosity of the material, or otherwise, the treatment is very efficacious and beneficial.

I do not claim broadly herein the method of purifying manganiferous material for industrial purposes, which comprises subjecting such material to a percolating action of a solution of ammonium chlorid, as claimed in my application, Serial No. 299,522; nor do I claim broadly herein the method of making a primary cell having a depolarizer and an electrolyte, which comprises treatment of the depolarizer with electrolyte material prior to the assembly of the cell, as claimed in my application, Serial No. 340,752; nor do I claim herein the feature of placing the principal electrolyte in the depolarizing mix, but not in the paste, as claimed in my application Serial No. 346,694; nor do I claim herein the dry cell per se, as claimed in my application, Serial No. 378,456.

It will be obvious that I do not limit myself in all aspects of the invention to the leaching or similar treatment of recovered manganese, as herein described, prior to the mixing of the same with graphite or other carbon material.

Various changes and modifications may be made in the detailed procedure herein described, and in other matters, without departing from the scope of the invention, as defined in the claims.

What I claim is:

1. The method of making a primary cell having a depolarizer containing recovered manganese, and an electrolyte, which comprises leaching the recovered manganese with a neutral solution of the electrolyte salt prior to the assembly of the cell.

2. The method of making a primary cell having a depolarizer containing recovered manganese, and an electrolyte, which comprises leaching the recovered manganese with a solution of ammonium chlorid prior to the assembly of the cell.

3. The method of making a primary cell having a depolarizer containing recovered manganese, and an electrolyte which comprises the leaching of the recovered manganese with a solution of ammonium chlorid of usual electrolyte concentration prior to the assembly of the cell, and then mixing the treated manganese material with carbon.

4. The method of making a primary cell having a depolarizer containing carbon and a recovered manganese of the saccharin byproduct type, which comprises the leaching of the recovered manganese material with a solution of ammonium chlorid prior to the assembly of the cell.

5. The method of making a depolarizing mix for dry cells, which comprises leaching with a solution of ammonium chlorid, the dark blue manganese precipitate derived as a by-product in the manufacture of saccharin.

6. The method of making a depolarizing mix for dry cells, which comprises leaching with a solution of ammonium chlorid, the dark blue manganese precipitate derived as a by-product in the manufacture of saccharin, and then mixing such material with finely divided graphite.

7. The method of making a depolarizing mix for dry cells, which comprises leaching with a solution of ammonium chlorid, the dark blue manganese precipitate derived as a by-product in the manufacture of saccharin, and then mixing such material with finely divided graphite in approximately the proportions of 37 units of recovered manganese to 12 units of graphite.

8. The method of making a depolarizing mix for dry cells, which comprises mixing together recovered manganese, graphite and ammonium chlorid in approximately the proportions of 37 units of recovered manganese, 12 units of graphite and 10 units of ammonium chlorid.

9. In the manufacture of primary cells, the step which consists of leaching hydrated artificial manganese material with a solution of ammonium chlorid prior to the assembly of the cell.

10. A depolarizer for dry cells containing a dark blue manganese dioxid precipitate of the saccharin by-product type, leached with an ammonium chlorid solution.

11. A depolarizing material for dry cells comprising a dark blue manganese dioxid precipitate derived as a by-product from the manufacture of saccharin and wholly insoluble in a solution of ammonium chlorid of usual electrolyte concentration.

12. Depolarizing material consisting of a dark blue precipitate derived as a by-product in the manufacture of saccharin, but treated so as to be wholly insoluble in a solution of ammonium chlorid of 2° Baumé.

13. Depolarizing material derived from a manganate and in the form of an extremely fine precipitate of dark blue color, such material being an impalpable powder substantially devoid of potash and lime and having or susceptible of taking up a high content of oxygen.

14. Depolarizing material derived from a manganate and in the form of an extremely fine precipitate of dark blue color, such material being an impalpable powder substantially devoid of potash and lime and having or susceptible of taking up a high content of oxygen, such material being wholly insoluble in a solution of ammonium chlorid of usual electrolyte concentration.

15. A depolarizer for dry cells comprising a dark blue impalpable precipitate substantially devoid of lime and potash, having a great affinity for hydrogen and wholly insoluble in an ammonium chlorid solution of 2° Baumé.

16. The method of making a depolarizer containing hydrated manganese dioxid, which comprises leaching hydrated manganese dioxid with a neutral salt solution prior to the assembling of the cell until all impurities soluble in such solution are dissolved and carried off.

17. The method of making a depolarizer containing hydrated manganese dioxid, which comprises leaching hydrated manganese dioxid with a neutral salt solution until all impurities soluble in such solution are dissolved and carried off, then drying such material and exposing it to the air so that it will take up oxygen, and then assembling such material in the cell.

18. The method of making a primary cell having a depolarizer containing artificial hydrated manganese, which comprises leaching the manganese material with a solution of an ammonium salt until all impurities soluble in such solution are dissolved and carried off, then drying the material and permitting it to absorb oxygen, and then assembling such material in the cell.

19. The method of making a primary cell having a depolarizer containing hydrated manganese dioxid, which comprises leaching the dioxid material with a solution of a neutral salt until all impurities soluble such solution are dissolved and carried then drying the material by subjecting to a temperature of approximately 140° then mixing such material with carbonaus material and placing it in the cell.

20. A depolarizing material for dry cells, consisting of ammonium-chlorid-leached dark blue manganese precipitate.

21. A depolarizing material for dry cells, comprising ammonium-chlorid-leached dark blue manganese precipitate of the saccharin by-product type.

22. A depolarizing material for use in dry cells, in the form of a fine precipitate containing about sixty-five per cent of anhydrous manganese dioxid, substantially devoid of water soluble organic and inorganic substances, and containing a small percentage of ammonia.

23. A depolarizing material for dry cells, in the form of a manganese precipitate containing approximately sixty-five per cent of manganese dioxid and substantially free of water soluble carbonates and lime.

24. A depolarizing material for dry cells, in the form of a manganese precipitate containing approximately sixty-five per cent of manganese dioxid and substantially free of water soluble carbonates and lime, but containing a small percentage of ammonia.

25. A depolarizing material for dry cells, in the form of a fine blue precipitate having large manganese dioxid content, less than one per cent of water soluble matters, including carbonates, and practically free of lime.

26. A depolarizing material for dry cells, in the form of a fine precipitate containing large percentage of manganese dioxid, less than one per cent of water soluble organic and inorganic matters, less than one per cent of carbon dioxid, and practically free of lime.

27. A depolarizing material for dry cells, in the form of a fine precipitate containing large percentage of manganese dioxid, less than one per cent of water soluble organic and inorganic matters, less than one per cent of carbon dioxid, and practically free of lime, but containing approximately five per cent of ammonia.

28. A depolarizing material for dry cells, in the form of a fine dark blue manganese precipitate derived as a by-product in the manufacture of saccharin and leached with a neutral salt solution so as to have a high manganese dioxid content, and practically free of water soluble carbonates.

29. A depolarizing material for dry cells, in the form of a fine dark blue manganese precipitate derived as a by-product in the manufacture of saccharin, leached with a neutral salt solution so as to have a high manganese dioxid content, and containing considerably less than eight per cent of water soluble organic and inorganic matters, including carbonates.

30. A depolarizing material for dry cells, in the form of a dark colored precipitate leached with an ammonium chlorid solution so as to have a high oxygen content, practically free of carbonates, carbon dioxid, and lime, but containing a small percentage of ammonia.

31. A depolarizing material for dry cells comprising purified manganate derivative.

32. A depolarizing material for dry cells comprising a derivative of potassium permanganate, leached with a neutral purifying solution.

33. A depolarizing material for dry cells comprising an ammonium-chlorid-leached potassium permanganate derivative.

34. A depolarizing material for dry cells comprising an ammonium-chlorid-leached potassium permanganate derivative, the same containing approximately sixty-five percent of manganese dioxid, less than one percent of water soluble organic and inorganic matters including carbonates, less than one percent of carbon dioxide and not more than a trace of lime.

35. In a dry cell, a depolarizer comprising a preleached manganate derivative.

36. In a dry cell, a depolarizer comprising a dark blue manganate derivative which when freshly placed in the cell is wholly insoluble in an ammonium chlorid solution of usual electrolyte concentration.

37. In a dry cell, a depolarizer comprising a dark blue powder, the same being purified manganate derivative.

In witness whereof, I have hereunto set my hand on the 21st day of February, 1920.

HAROLD DE OLANETA.